No. 770,536. PATENTED SEPT. 20, 1904.
J. E. PRICE.
MOLDING APPARATUS.
APPLICATION FILED FEB. 9, 1904.
NO MODEL. 2 SHEETS—SHEET 1.

Witnesses
Inventor
Jonathan E. Price
By his Attorneys

No. 770,536. PATENTED SEPT. 20, 1904.
J. E. PRICE.
MOLDING APPARATUS.
APPLICATION FILED FEB. 9, 1904.
NO MODEL. 2 SHEETS—SHEET 2.
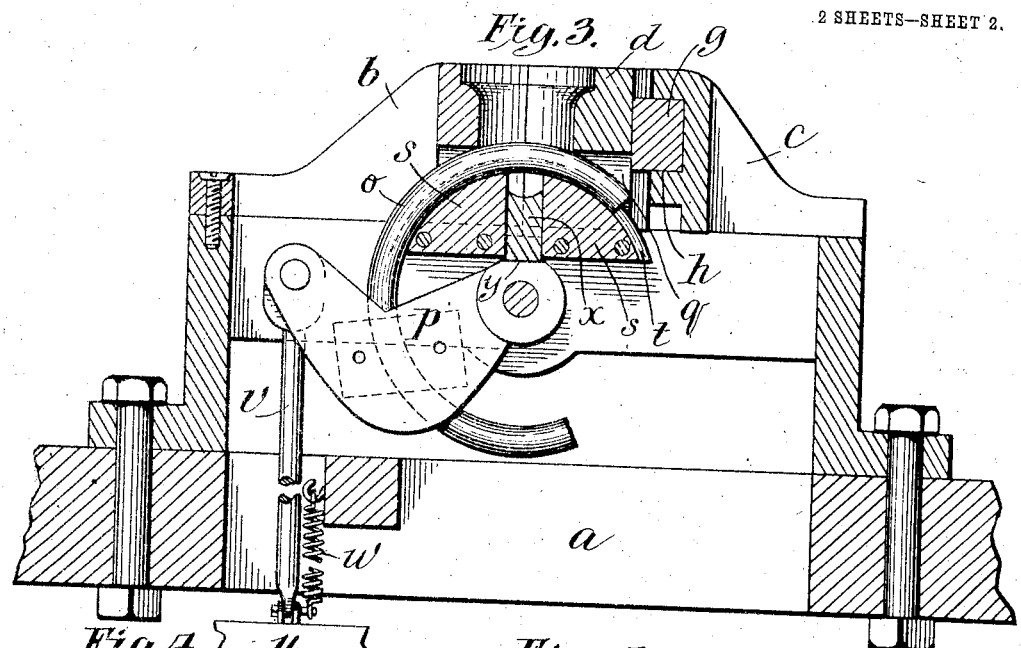
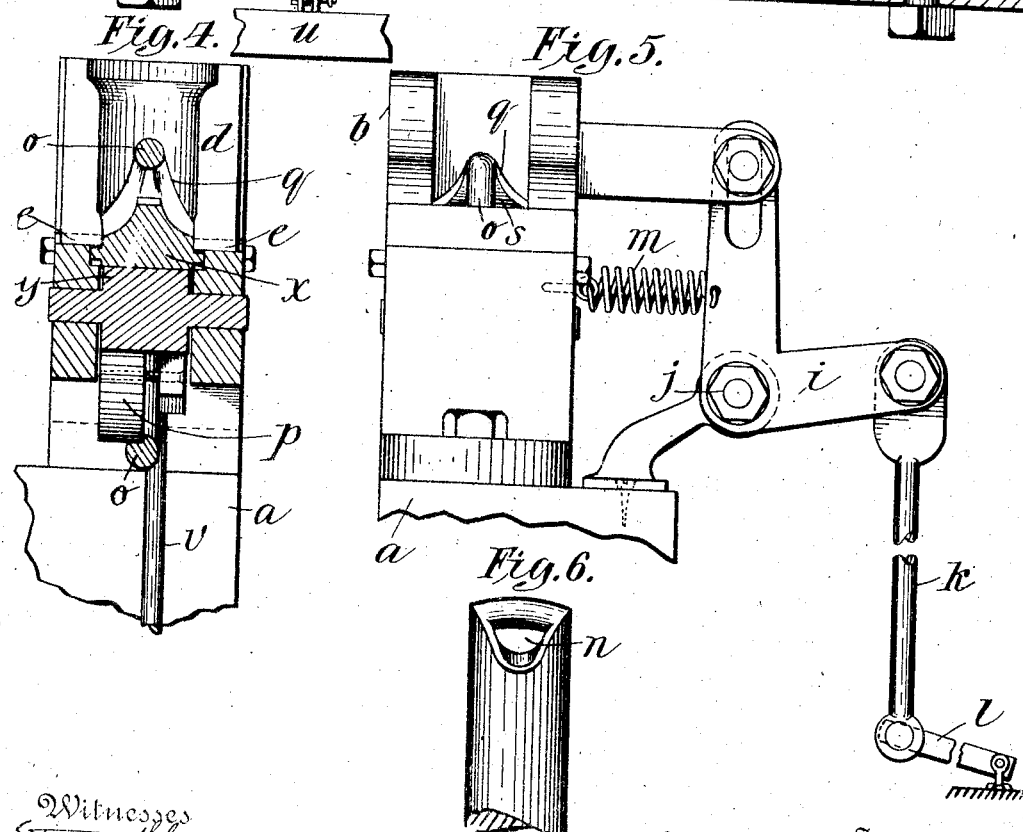

No. 770,536.

Patented September 20, 1904.

UNITED STATES PATENT OFFICE.

JONATHAN E. PRICE, OF CHATTANOOGA, TENNESSEE.

MOLDING APPARATUS.

SPECIFICATION forming part of Letters Patent No. 770,536, dated September 20, 1904.

Application filed February 9, 1904. Serial No. 192,763. (No model.)

*To all whom it may concern:*

Be it known that I, JONATHAN E. PRICE, a citizen of the United States, and a resident of Chattanooga, in the State of Tennessee, have invented certain new and useful Improvements in Molding Apparatus, of which the following is a specification, reference being made to the accompanying drawings, forming a part hereof.

In the molding of such articles as sand cores, where the box or form in which the core is made has two or more parts, it has been customary for the operator to hold the parts of the mold-box together during the molding operation by pressing upon a foot-lever or the like which controlled suitable mechanism between said lever and the mold parts. In such apparatus owing to carelessness of the operators it frequently happens that the parts of the mold are not held together properly during the molding operation and the core or other article being formed is molded with a rib or some sort of projection which is formed in the space or spaces left between the mold parts. Furthermore, in these molding apparatuses where the molded core is to be provided with an eye, such as that in a sash-weight, for instance, the sand or other substance being molded is often imperfectly packed around the eye-forming tool, more particularly between the eye-forming tool and the end of the mold, the result being that an imperfect core is formed.

The objects of this invention are to eliminate these defects in the molding apparatuses referred to, and, furthermore, to provide a molding apparatus which shall be particularly adapted for molding sand cores and the like.

In the accompanying drawings an apparatus is shown for molding sand cores such as are adapted to be used in the manufacture of sash-weights.

Figure 1:
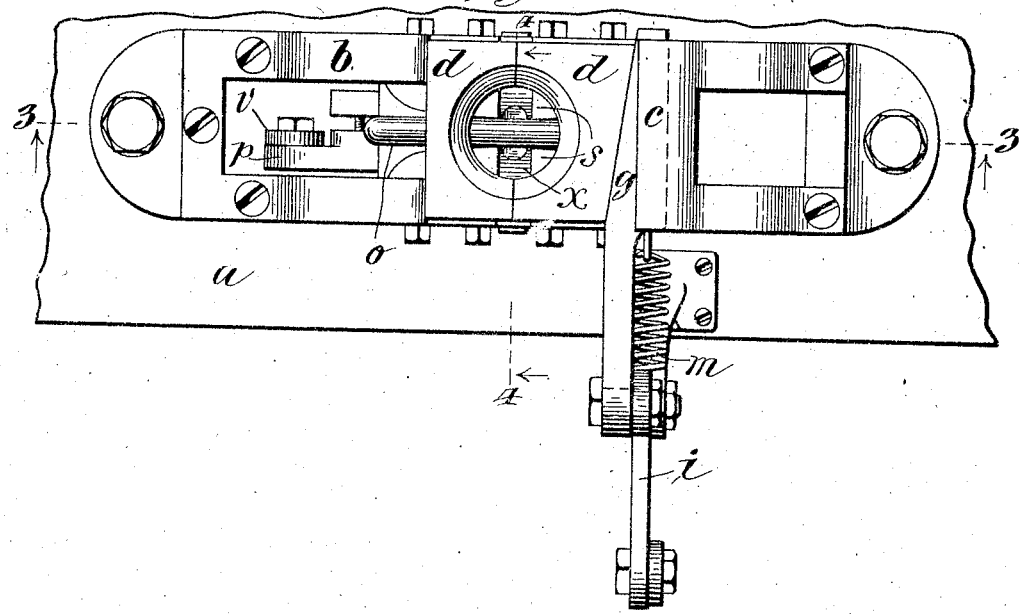
Figure 2:
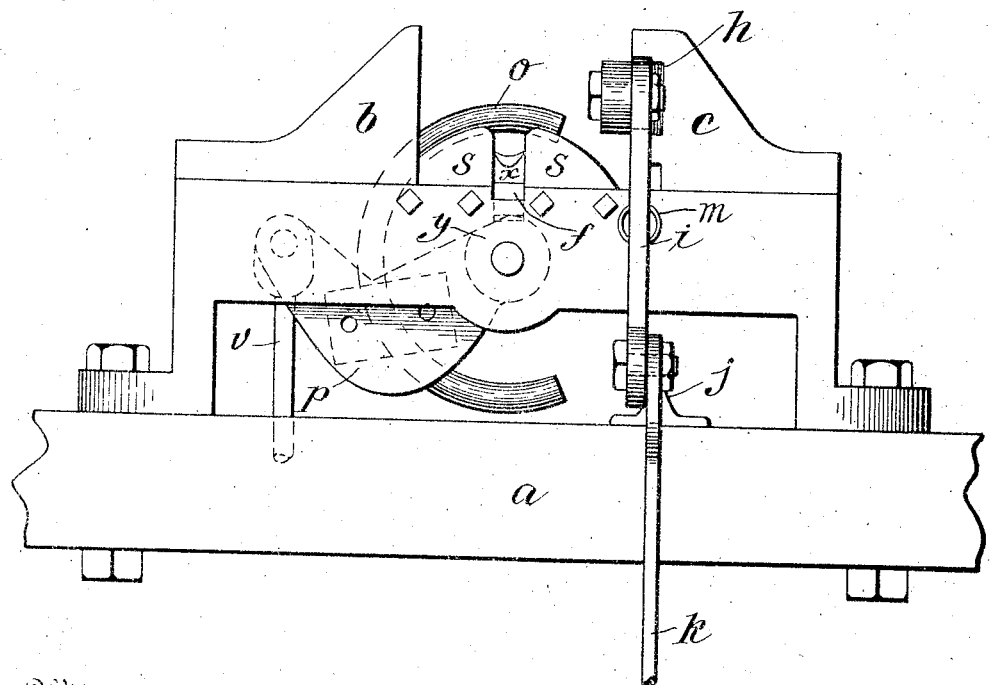

In said drawings, Figure 1 is a plan view of the apparatus. Fig. 2 is a front elevation with the mold or core box removed. Fig. 3 is a vertical section taken on the plane indicated by the line 3 3 in Fig. 1. Fig. 4 is a vertical section taken on the plane indicated by the line 4 4 in Fig. 1. Fig. 5 is an end view, and Fig. 6 is a view in elevation, of one of the cores molded by the apparatus.

The apparatus has a suitable frame or base $a$, having side pieces $b$ and $c$, between which the mold or core box $d$ is fitted. This box, as shown, is made in two parts, each of which is provided with projections $e$, which are brought into a groove $f$ in the frame when the mold is placed upon the same. After the mold has been thus placed on the frame one of the mold parts will be in contact with the side piece $b$ thereof, and in order to hold the other part of the mold tightly against the first part a wedge $g$ is provided between said other part of the mold and the side piece $c$ of the frame. The side piece $c$ of the frame is preferably provided with a groove $h$, in which the wedge $g$ is guided as it is moved in and out between the mold and the frame. To operate the wedge, it may be pivoted to one arm of a bell-crank lever $i$, which in turn is pivoted at $j$ to the base, while the other arm of the lever is connected by a link $k$ to a treadle $l$, placed in a convenient position for the operator. In order to make sure that the parts of the mold shall always be tightly held together, the wedge is normally maintained by a spring $m$ in its operative position—that is, tightly forced between the mold and frame, as shown in Fig. 1—the spring $m$ being secured to one arm of the lever $i$ and to the base $a$.

For forming the eye $n$, Fig. 6, in the core a forming-tool $o$, bent in the arc of a circle, is secured to an arm $p$, pivoted at the center of the circle in the base $a$, so that as said arm swings upon its pivot the molding-tool is moved along the circumference of the circle into and out of the mold, which is provided with apertures $q$ on either side thereof to permit the insertion of said tool. There are also provided in the frame upright pieces or projections $s$, which serve to center the mold and to fill up the lower ends of the apertures therein, and the upper sides of these projections are formed with a circular groove $t$, in which the forming-tool works as it is moved into and out of the mold. The molding-tool is preferably operated by a treadle $u$, connected with a link $v$ to the arm $p$, a spring $w$ being provided between the treadle and the base, so as to hold the forming-tool normally in its forming position, as shown in Figs. 1 and 3. It will be obvious, however, that any other suitable means may be provided to operate the forming-tool.

In the frame, near the lower end of the mold, is a molding-piece $x$, which, forming the closure for the lower end of the mold-box, is adapted to form the ends of the cores. As the forming-tool is withdrawn this molding-piece is acted upon by a cam $y$, formed upon or secured to the arm $p$ in such a way as to cause the molding-piece to be advanced toward the forming-tool before the forming-tool is wholly withdrawn from the mold. The cam in the present instance is circular, except for a small portion, which is flattened, upon which portion the molding-piece rests when the material to be molded is introduced into the mold. When the forming-tool is withdrawn, as will be seen clearly from Fig. 3, one end of the flattened portion will cause the molding-piece to move in the manner above described. In this way the sand or other material being molded will be tightly packed between the end of the mold and the forming-tool.

When the material to be molded is placed into the apparatus, the parts are in the position shown in Figs. 1 and 3—that is, the mold is in position upon the frame, the wedge is forced tightly between the mold and the frame, and the end of the forming-tool is extended into the mold. The substance to be molded is then placed into the mold and pressed down. After the core has been formed the operator presses the treadle $u$, thus withdrawing the forming-piece, and then presses upon the treadle $l$ to release the mold. As soon as the mold is released by the wedge it is removed from the frame and separated to eject the core. It will be seen that the wedge and forming-tool are always retained in their operative positions except when the operator presses upon the treadles.

I claim as my invention—

1. In a molding apparatus, the combination of a frame, a two-part mold-box, a wedge between the box and frame, a spring to hold the wedge normally between the box and the frame, a foot-lever, and operative connections between the lever and wedge.

2. In a molding apparatus, the combination of a frame, a forming-tool, a two-part mold-box with an aperture at either side to receive the forming-tool, a wedge between the box and frame, a spring to hold the wedge normally between the box and frame, a foot-lever, and operative connections between the lever and wedge.

3. In a molding apparatus, the combination of a frame, a mold-box, a forming-tool extending into the mold-box, and means constituting the closure of one end of the mold-box adapted to approach the forming-tool as the apparatus is operated to pack the material between said means and the forming-tool.

4. In a molding apparatus, the combination of a frame, a mold-box, a forming-tool extending into the mold-box, a molding-piece constituting the closure of one end of the box, and means to move the molding-piece toward the forming-tool as the apparatus is operated.

5. In a molding apparatus, the combination of a frame, a mold-box, a forming-tool pivoted in the frame so as to be capable of moving into and out of the box, a molding-piece near the end of the box, and a cam operating against the molding-piece and so secured to the forming-tool as to cause the molding-piece to be advanced toward the molding-tool before the molding-tool can be removed from the box.

6. In a molding apparatus, the combination of a frame with a groove therein, a two-part mold-box having projections upon each part which are adapted to be brought together in the groove, a forming-tool extending through the mold-box, a wedge between the frame and the box to hold the two parts of the box together, a spring to hold the wedge normally between the box and frame, a foot-lever, and operative connections between the lever and wedge.

This specification signed and witnessed this 5th day of February, A. D. 1904.

JONATHAN E. PRICE.

In presence of—
ANTHONY N. JESBERA,
LUCIUS E. VAMER.